United States Patent
Potter, Jr. et al.

(10) Patent No.: US 6,593,062 B1
(45) Date of Patent: Jul. 15, 2003

(54) FORMATION OF BULK REFRACTIVE INDEX STRUCTURES

(75) Inventors: Barrett George Potter, Jr., Albuquerque, NM (US); Kelly Simmons Potter, Albuquerque, NM (US); David R. Wheeler, Albuquerque, NM (US); Gregory M. Jamison, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 63 days.

(21) Appl. No.: 10/020,046

(22) Filed: Dec. 7, 2001

(51) Int. Cl.[7] ................................................ G03C 5/00
(52) U.S. Cl. ........................ 430/290; 430/22; 430/321
(58) Field of Search ................................ 430/290, 321, 430/22, 945

(56) References Cited

U.S. PATENT DOCUMENTS

| | | | |
|---|---|---|---|
| 5,841,928 A | 11/1998 | Maxwell et al. | ............ 385/129 |
| 5,932,397 A | 8/1999 | Mustacich | ................... 430/321 |
| 5,940,568 A | 8/1999 | Losch | .......................... 395/129 |
| 5,945,261 A * | 8/1999 | Rourke | ........................ 430/321 |
| 6,081,632 A | 6/2000 | Yoshimura et al. | ............. 385/5 |
| 6,136,592 A | 10/2000 | Leighton | .................. 435/288.7 |
| 6,428,944 B1 * | 8/2002 | Alibert et al. | .............. 430/321 |

OTHER PUBLICATIONS

U.S. patent application Ser. No. 09/492.956, Potter et al., filed Jan. 27, 2000.

U.S. patent application Ser. No. 09/788,052, Potter et al., filed Feb. 16, 2001.

* cited by examiner

Primary Examiner—John A. McPherson
(74) Attorney, Agent, or Firm—Elmer A. Klavetter

(57) ABSTRACT

A method of making a stacked three-dimensional refractive index structure in photosensitive materials using photopatterning where first determined is the wavelength at which a photosensitive material film exhibits a change in refractive index upon exposure to optical radiation, a portion of the surfaces of the photosensitive material film is optically irradiated, the film is marked to produce a registry mark. Multiple films are produced and aligned using the registry marks to form a stacked three-dimensional refractive index structure.

16 Claims, 4 Drawing Sheets

FORMATION OF BULK REFRACTIVE INDEX STRUCTURES

This invention was made with Government support under Contract No. DEAC04-94AL85000 awarded by the Department of Energy. The Government has certain rights in the invention.

BACKGROUND OF THE INVENTION

The invention describes a method for developing three-dimensional refractive index structures using optical irradiation and, more particularly, a method using photo-patterning technology to develop three-dimensional refractive index structures in layered, stacked, photosensitive thin film materials.

Photo-lithographic patterning typically focuses on the formation of two-dimensional patterns in a photoresist material, involving the use of multiple chemical and mechanical processing steps and material deposition steps. In contrast, photosensitive materials are those materials into which a stable refractive index change can be photo-imprinted, such as by using a single-step, direct writing approach. This provides an opportunity over more conventional photolithography for rapid, agile manufacture of integrated photonic device structures useful for optical signal manipulation and remote environmental sensing. Photosensitive Bragg gratings, in fact, are the basis for a wide range of photonic devices that are used in optical telecommunication applications. Such gratings are photo-imprinted into the core of an optical fiber to provide such functions as spectral filtering and dispersion compensation.

In photolithography, a positive or negative image of the desired configuration is first introduced into a photoresist material by exposing it to patterned radiation that induces a chemical change in the exposed portions of a resist material. This chemical change is then exploited to develop a pattern in the material, which is then transferred into the substrate underlying the resist. Photo-patterning is used to alter the chemical resistance of photoresist material to chemical attack. The photoresist material is not retained in the finished product. The photo-patterned photoresist provides an opportunity to selectively deposit materials at precise locations over the surface of the piece or to selectively etch certain locations. Thus, refractive index structures are usually formed using dissimilar material types (such as glass versus crystalline or insulator versus semiconductor) or material compositions (varied dopant identities or concentrations) whose spatial distribution is formed via the photo-patterning of photoresist layers. Because of this use of multiple materials, multiple photo-patterning steps and chemical processing of the piece are generally required. These steps also require precise registry of the mask images used in consecutive photo-patterning steps.

Other methods for the formation of refractive index structures include electron and ion beam etching (including reactive ion etching). In these cases, spatial patterning of the refractive index is dictated by selective exposure (etching) of the parent material with a particle beam. This is followed by further thermal or chemical processing and/or deposition of dissimilar materials to provide a finished product. These energetic particle approaches require vacuum chamber technology and can be expensive. With control of the etching conditions, it is possible to build in some control of the structure cross section with depth into the material but the types of structure possible are limited and, again, the overall process is multi-step in nature, yielding a heterogeneous material structure. Mechanical machining might also be used but the difficulties in the formation of complex shapes at a small scale tend to make this approach expensive and not amenable to large volume production.

In direct writing of index modulations using a photosensitive materials approach, the processing techniques and conditions are typically more benign and can be applied to varied bulk material geometries, e.g. fiber and thin film. Common to both fiber and thin film implementations of photosensitivity, however, the photo-imprinted refractive index structure is typically only defined in two dimensions within the material. In most cases, the refractive index profile does not vary with the depth into the photosensitive material. The production of three-dimensionally defined refractive index structures would greatly increase the versatility and applicability of photosensitive materials.

In conventional, homogeneous photosensitive materials, the photosensitive change in refractive index is initiated via a one-photon absorption process into an absorption band of the material located at some characteristic wavelength, $\lambda$. The wavelength of the light used to imprint the refractive index change, referred to as the writing wavelength, is tuned to access the wavelength $\lambda$ characteristic of the material. Hereinafter, writing an index structure means that the refractive index of some volume of the material is changed through exposure to optical radiation, thereby forming a structure (a volume of the material within the material with a refractive index different than the original material). However, formation of subsurface structures (that is, structures formed entirely in the interior of the material) in a homogeneous material is not possible using a single writing wavelength because the optical radiation must first traverse the material from the surface to the desired target volume element. Because the entire material volume is photosensitive, that intermediate material will also undergo a refractive index change.

Three-dimensional structures in a homogeneous material have been formed using optical illumination systems (see U.S. patent application Ser. No. 09/492,956, filed on Jan. 27, 2000, now U.S. Pat. No. 6,368,775 incorporated herein by reference) and also using composite materials (see U.S. patent application Ser. No. 09/788,052, filed on Feb. 16, 2001; incorporated herein by reference). Mustacich (U.S. Pat. No. 5,932,397, issued on Aug. 3,1999) describes formation of three-dimensional gradients in a homogeneous material through control of the distribution of wavelengths used in illuminating the material. Yoshimura et al. (U.S. Pat. No. 6,081,632, issued on Jun. 27, 2000) describe forming optical waveguide systems in a homogeneous material to produce a refractive index distribution while inducing self-focusing and insolubilizing the photosensitive material.

Useful would be a method for forming three-dimensional structures in a photosensitive material where these structures are formed with desired refractive index three-dimensional profiles.

DESCRIPTION OF SPECIFIC EMBODIMENTS

Figure 1:
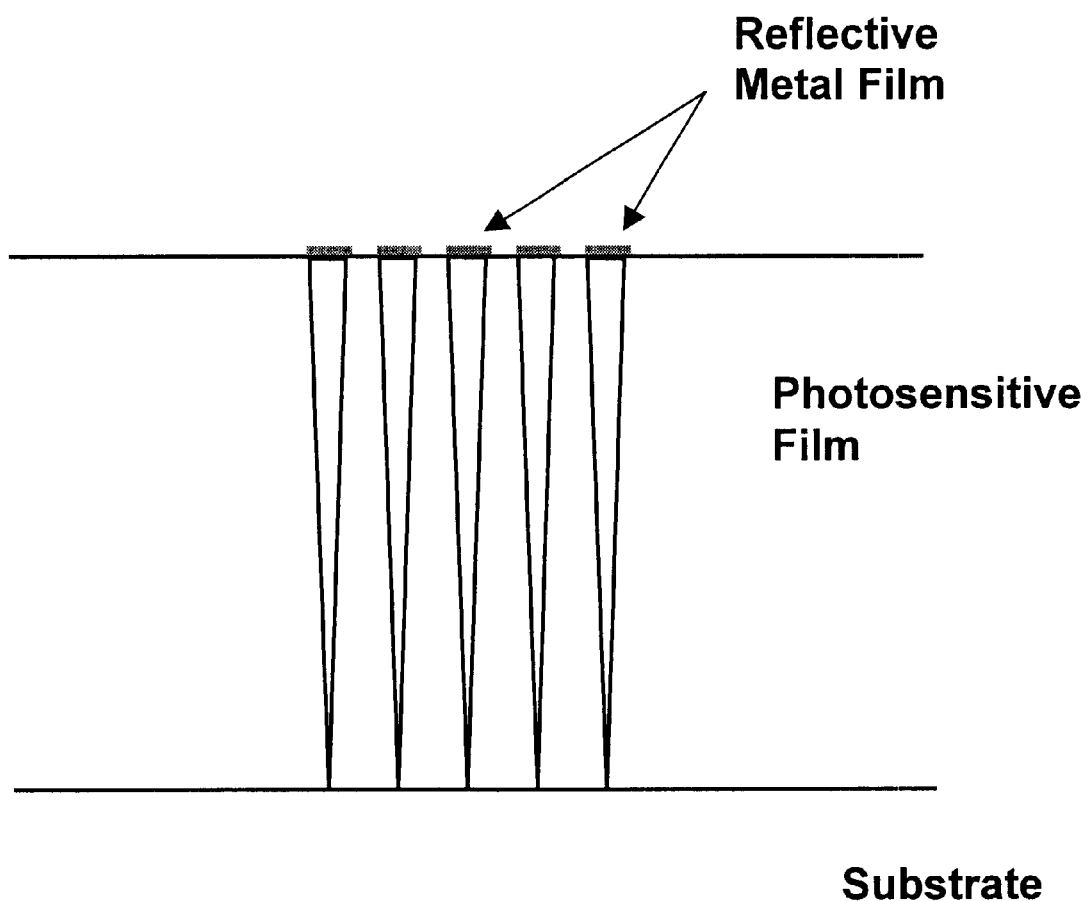
FIG. 1 shows an optical device structure produced using the method of the present invention.

Materials are required having three-dimensional refractive index structures. Photosensitive materials can be utilized into which a stable refractive index change can be photo-imprinted. As films, refractive index changes are generally made in photosensitive materials to generate two-dimensional structures. In the method of the present invention, a film of photosensitive material is exposed to optical radiation at the appropriate wavelength through a metal mask to initiate changes in the film refractive index. Multiple film layers ranging in thickness from 1 micron to 100 microns or more can be likewise exposed to yield a collection of film layers or sheets with the desired two-dimensional refractive index pattern imprinted in each layer. These multiple film layers can then be aligned and stacked to produce a film with the desired dimensions and a desired three-dimensional refractive index structure.

In one embodiment, a photosensitive material is first characterized to determine the wavelengths at which the material changes refractive index upon exposure to an optical source and to determine the magnitude of this change. When optically irradiated at a particular wavelength, the material undergoes either a positive refractive index change or a negative refractive index change. Any photosensitive material can be used; typical materials include oxide and non-oxide glasses including, but not limited to, silicates, such as germanosilicates, tellurites, chalcogenides, fluorides, polygermanes, polysilanes, polygermane and polysilane sol-gel hybrids, and photoactive polymers such as functionalized polyesters. In the context of the method of the present invention, a photosensitive material is any material that exhibits a photochemical reaction that results in a change in the refractive index of the material. The photosensitive material is generated as a free-standing film, with dimensions ranging from 1 micron to 100 microns in thickness, with areas ranging from 1 $mm^2$ to greater than 100 $mm^2$. In some instances the film may be supported by a transparent or a removable carrier substrate. A portion of the surface of the photosensitive material is irradiated by an optical source in an appropriately designed illumination system. This illumination system can include, for example, a micro-lenslet array, a binary optic phase mask or a macroscopic refractive lens array. The optical source in the illumination system used to irradiate the photosensitive material can be an arc lamp, laser, such as an excimer laser, or any incoherent or coherent optical source possessing output wavelengths and powers appropriate to the photosensitive material used. In one embodiment, the photosensitive material is exposed to a source using ultraviolet light. Using photosensitive materials that are sensitive to ultraviolet light avoids the presence of optical absorption in the visible portion of the spectrum. In general, the optical source is selected to produce a light coherence length less than the photosensitive material thickness.

The optical radiation impinges on one surface of the photosensitive material. The illumination system provides the correct wavelength to match the photosensitive response wavelength needed by the photosensitive material. The wavelength is chosen to match an absorption band of the photosensitive material. It is through absorption into this band that the light energy couples to the material to produce the index change. The volume of the photosensitive material that is irradiated by the illumination system thereby undergoes either a positive or negative refractive index change, resulting in a refractive index structure in the film layer.

Multiple layers with refractive index structures are formed using this procedure. To produce a thick stack of material with a three-dimensional structure of thickness greater than approximately 10 microns, these multiple layers are aligned in registry, meaning that the areas of refractive index change in adjacent layers are aligned as desired to produce a three-dimensional structure. Registry can be accomplished in various ways, including the use of through holes by which the stacked layers can be aligned. The term "registry" as used herein simply means that the individual layers are aligned using alignment holes or other marks on each individual layers. Each layer has a top side, a bottom side, and a pattern of through-holes, wherein the through-holes are put in registry to stack the layers. For example, Leighton (U.S. Pat. No. 6,136,592, issued on Oct. 24, 2000; incorporated herein by reference) describes stacking a plurality of substrates with through-holes, putting the stack in registry using the through-holes to form tunnels extending through the stack of substrates so that reagents of interest are caused to flow through the tunnels. In Leighton, registry is accomplished using through-holes of adjacent substrates in the stack in communication. In some designs, the individual layers are patterned with 180 degree symmetry such that when a first layer is rotated about 180 degrees and stacked on top of a second, non-rotated substrate, the through-holes remain in registry. This can make it possible to simplify manufacturing.

Alternatively, protrusions (bosses) on one side of each film layer, for example on the top side of the layer, and corresponding depressions on the opposite side, for example the bottom side, can be used to align the layers to create a stack with all holes in registry. Alternately, pins can be placed through alignment holes provided in all of the layers to achieve the same end. Further yet, if the machining is sufficiently accurate, the layers can be aligned with reference to their edges by providing guides against which to rest all of the layers. Other methods for aligning will be obvious to anyone skilled in the art.

Figure 2A:
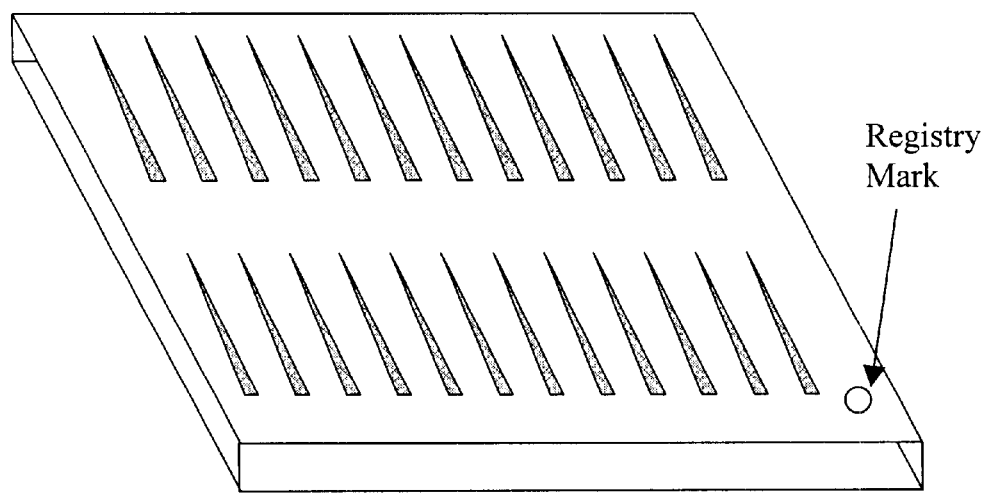
FIG. 2 shows a) a single photosensitive film irradiated to form a film structure and b) a stack of multiple irradiated photosensitive films to form a three-dimensional structure.
Figure 2B:
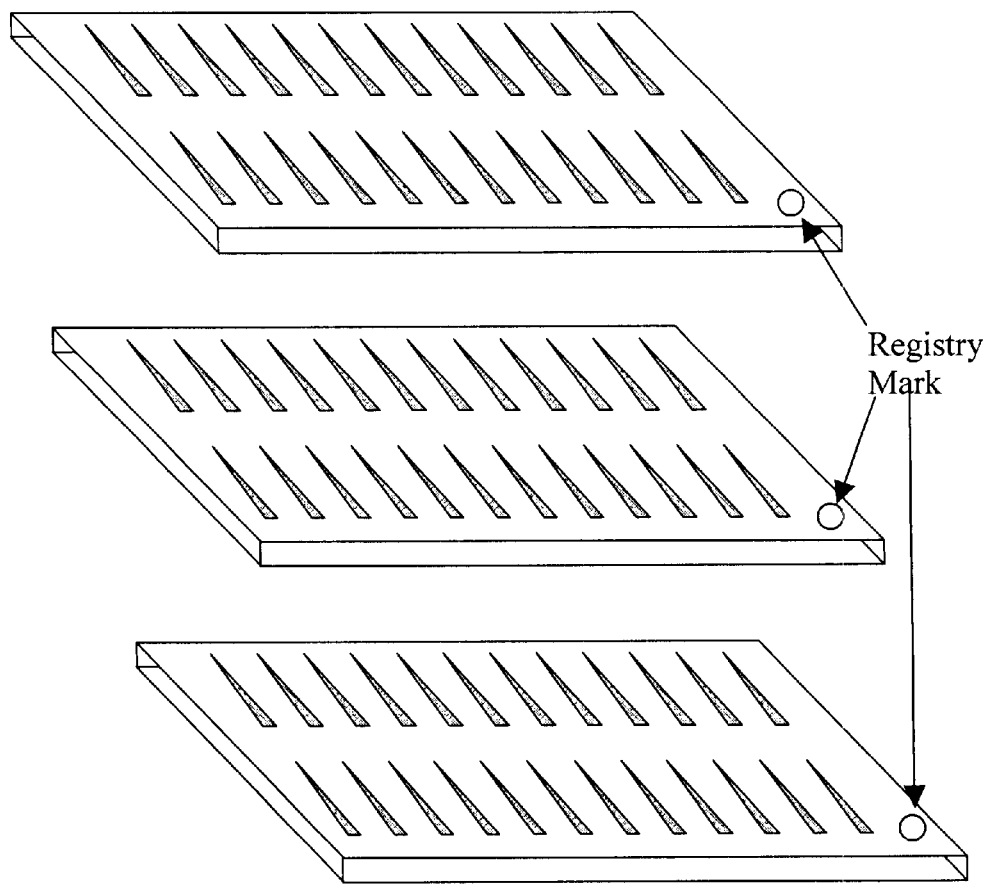
Figure 3:
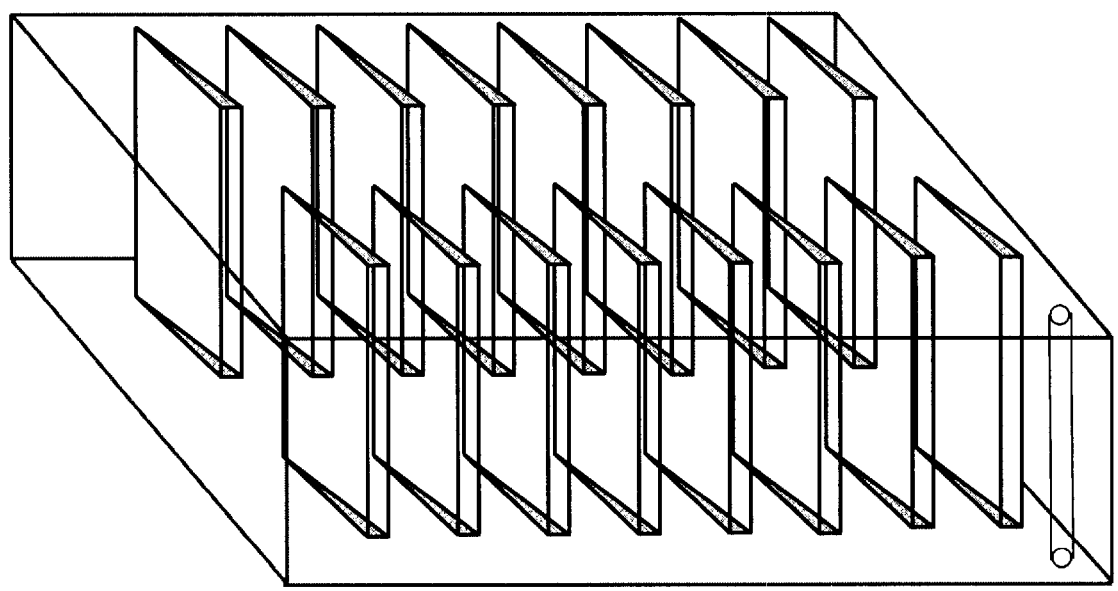
FIG. 3 shows a three-dimensional refractive index structure formed from a stack of films.
Figure 4:
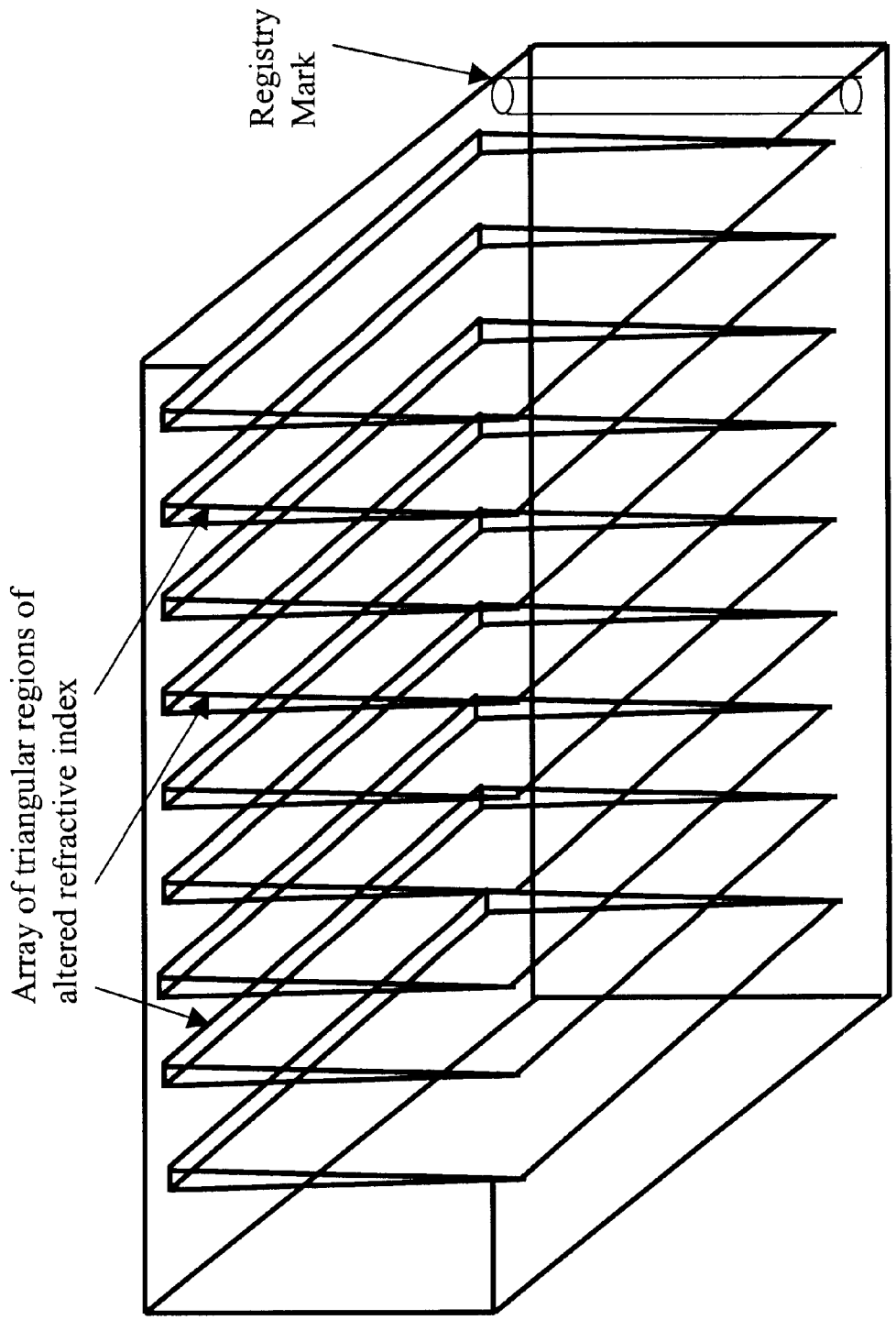
FIG. 4 shows a three-dimensional refractive index structure with a triangular array.

In one embodiment, an optical device structure, called a transflector, illustrated in FIG. 1, is produced using the method of the present invention. The required structure is contained with a film of photosensitive material and consists of laterally alternating, triangularly cross-sectioned, structured regions of high and low refractive index which extend, and change in dimension, through the thickness of the film. Using the method of the present invention, a film of photosensitive material, of thickness between approximately 1 micron and 100 microns, is exposed through a metal mask to optical radiation using an optical source at the appropriate wavelength to initiate changes in film refractive index. For the transflector design, the metal mask can consist of an array of high-aspect-ratio triangular holes through which light passes to expose the photosensitive film and initiate changes in refractive index. Exposure of a single film results in a thin film containing an array of low-index triangular regions, as depicted in FIG. 2a. Multiple film layers are similarly exposed wherein each layer has a registry mark (FIG. 2b). The registry marks are then aligned and the film layers stacked to produce a structured material with the desired dimensions (FIG. 3). The final structured material yields a three-dimensional array of triangular structures or of triangular trenches. If desired, individual thick sheets 10 to hundreds of microns thick and millimeters to hundreds of millimeters square in area containing only a single linear array of trenches can be cut or microtomed from this stack (see FIG. 4). Metalization of portions of the final film structure could be added to produce a highly reflective surface as is necessary for the transflector device described in this example. Additionally, multiple sheets of the structure could be joined, edge to edge, to produce large area films capable of covering such devices as computer screens.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of making a stacked three-dimensional refractive index structure in photosensitive materials using photo-patterning, comprising:

determining wavelengths at which a plurality of photosensitive material films exhibit a change in refractive index upon exposure to optical radiation;

optically irradiating a portion of the surfaces of the plurality of photosensitive material films;

marking said plurality of photosensitive material films to produce registry marks on each photosensitive material film;

aligning said plurality of photosensitive material films using said registry marks to form a stacked three-dimensional refractive index structure.

2. The method of claim 1 wherein the photosensitive material films comprise materials selected from the group consisting of oxide and non-oxide glasses, polygermanes, polysilanes, polygermane and polysilane sol-gel hybrids, and photo-active polymers.

3. The method of claim 1 wherein the photosensitive material films are comprised of germanosilicate.

4. The method of claim 1 wherein the plurality of photosensitive material films have thicknesses greater than approximately 1 micron.

5. The method of claim 1 wherein the plurality of photosensitive material films have thicknesses less than approximately 1 micron.

6. The method of claim 1 wherein the step of optically irradiating said surfaces is performed using a laser.

7. The method of claim 6 wherein the laser in an excimer laser.

8. The method of claim 1 wherein the wavelengths are chosen to match an absorption band of each photosensitive material film.

9. The method of claim 1 wherein the photosensitive material films are first deposited on a substrate.

10. The method of claim 9 wherein the substrate is fused silica glass.

11. The method of claim 1 wherein the stacked three-dimensional refractive index structure has a thickness greater than approximately 10 microns.

12. The method of claim 1 wherein the produced registry mark on each photosensitive material film is selected from a group including holes in said photosensitive material films, protrusions on one side of each photosensitive material film, pins on said photosensitive material films, and edge reference guides on said photosensitive material films.

13. The method of claim 1 wherein the plurality of photosensitive material films comprise materials that undergo a negative refractive index change upon expose to an optical source.

14. The method of claim 1 wherein the plurality of photosensitive material films comprise materials that undergo a negative refractive index change upon expose to an optical source.

15. The method of claim 1 wherein the plurality of photosensitive material films comprise materials which undergo a positive refractive index change and materials which undergo a negative refractive index change upon expose to an optical source.

16. The method of claim 1 further comprising the step of masking a surface of each of the plurality of photosensitive material films prior to optically irradiating said films.

* * * * *